US009500341B2

(12) United States Patent
Jungwirth

(10) Patent No.: US 9,500,341 B2
(45) Date of Patent: Nov. 22, 2016

(54) OPTICAL FILTERING SYSTEM FOR SOLAR CELL TESTING

(71) Applicant: The Boeing Company, Chicago, IL (US)

(72) Inventor: Douglas Ralph Jungwirth, Porter Ranch, CA (US)

(73) Assignee: THE BOEING COMPANY, Chicago, IL (US)

( * ) Notice: Subject to any disclaimer, the term of this patent is extended or adjusted under 35 U.S.C. 154(b) by 193 days.

(21) Appl. No.: 14/279,423

(22) Filed: May 16, 2014

(65) Prior Publication Data

US 2015/0330601 A1 Nov. 19, 2015

(51) Int. Cl.
*F21V 9/02* (2006.01)
*H02S 50/15* (2014.01)
*G01J 1/04* (2006.01)
*G01J 1/08* (2006.01)
*F21S 8/00* (2006.01)

(52) U.S. Cl.
CPC .............. *F21V 9/02* (2013.01); *F21S 8/006* (2013.01); *G01J 1/0418* (2013.01); *G01J 1/0433* (2013.01); *G01J 1/08* (2013.01); *H02S 50/15* (2014.12)

(58) Field of Classification Search
CPC ............ F21V 9/02; H02S 50/15; G01J 1/08; G01J 1/0433; G01J 1/0418; F21S 8/006
USPC ............ 362/2, 236, 242, 249.14; 324/761.01
See application file for complete search history.

(56) References Cited

U.S. PATENT DOCUMENTS

| 2009/0287446 A1* | 11/2009 | Wang ............... H01L 31/02167 702/116 |
| 2010/0014080 A1* | 1/2010 | Jungwirth ............... F21S 8/006 356/326 |
| 2010/0326493 A1* | 12/2010 | Sherman ............. H01L 31/0547 136/246 |
| 2012/0313661 A1 | 12/2012 | Jungwirth et al. | |

FOREIGN PATENT DOCUMENTS

GB 2459780 A 11/2009

OTHER PUBLICATIONS

International Search Report and Written Opinion, dated Jun. 2, 2015, regarding Application No. PCT/US2015/020701, 11 pages.
Emery et al., "Procedures for Evaluating Multijunction Concentrators," Conference Record of the Twenty-Eighth IEEE Photovoltaic Specialists Conference, Jan. 2000, pp. 1126-1130.
Nagamine et al., "New Solar Simulator for Multi-Junction Solar Cell Measurements," Proceedings of the Photovoltaic Specialists Conference, May 1993, pp. 686-690.
"Calibration Manual: Spectrosun X-25A Mark II Solar Simulator," Spectrolab, Inc, Document No. 034689, Revision N/C, copyright 2014, 35 pages.
"Narrow-band Single- and Multi-Notch Filter," Optics Balzers AG, 2 pages, accessed Mar. 18, 2014. http://www.opticsbalzers.com/en/194/Notch-Filters.htm.
"Notch Filters: Narrow-band Single- and Multi-Notch Filters," Optics Balzers AG, 2 pages, accessed May 12, 2014. http://www.opticsbalzers.com/download_temp/OBJ_001_PE.pdf.

* cited by examiner

*Primary Examiner* — Anh Mai
*Assistant Examiner* — Glenn Zimmerman
(74) *Attorney, Agent, or Firm* — Yee & Associates, P.C.

(57) ABSTRACT

A method and apparatus for simulating light. A first light from a first filterer is output to a solar cell. The first light output by the first filterer has a coarse spectrum that simulates the light in a selected environment. A second light from a second filterer is output to the solar cell while the first light is output by the first filterer. The second light output by the second filterer has a fine spectrum selected for a group of junctions in the solar cell.

20 Claims, 11 Drawing Sheets

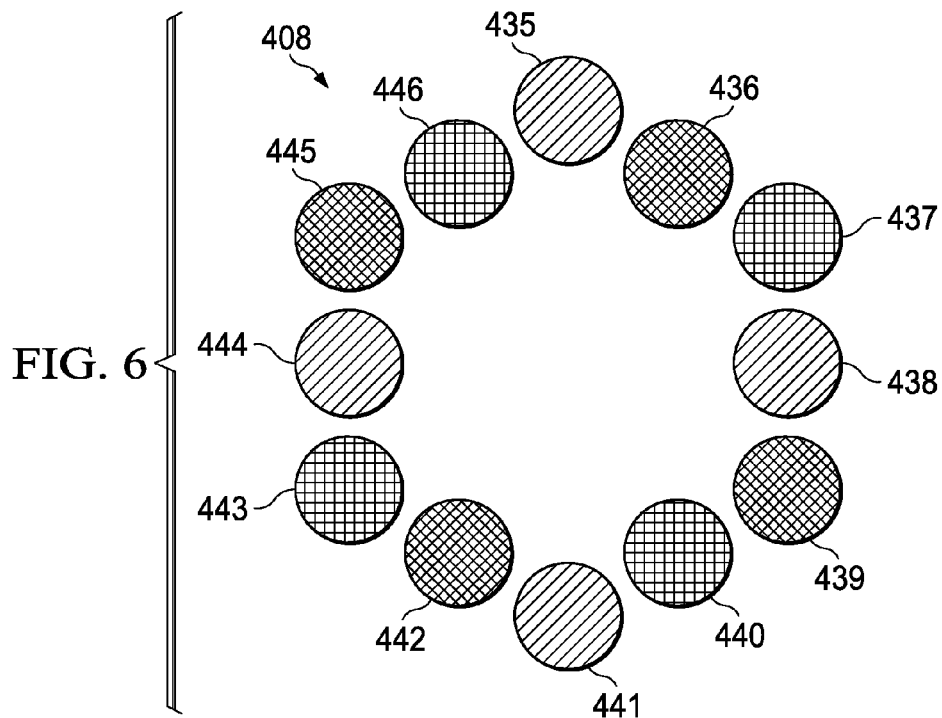
FIG. 6
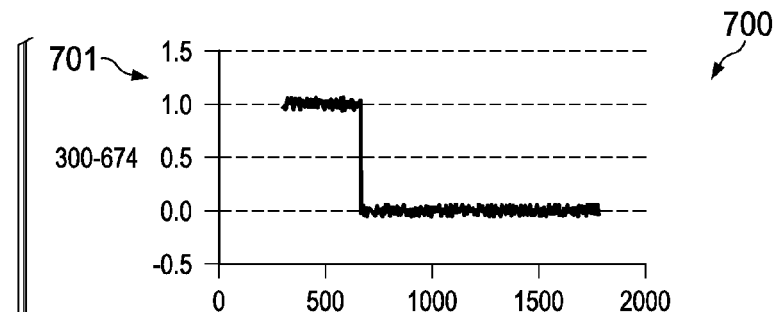
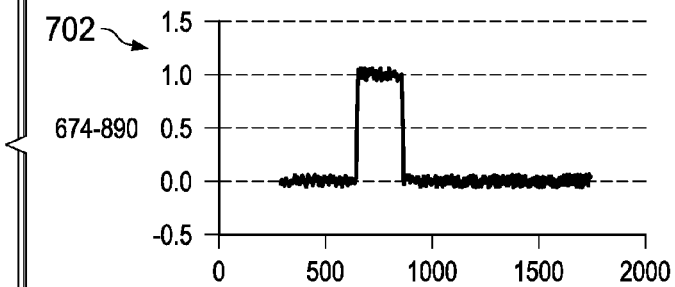
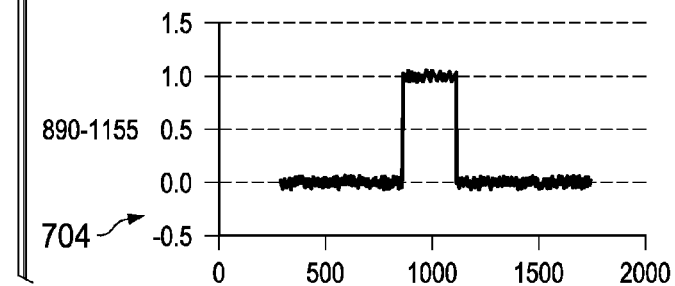
FIG. 7

OPTICAL FILTERING SYSTEM FOR SOLAR CELL TESTING

BACKGROUND INFORMATION

1. Field

The present disclosure relates generally to solar simulators and, in particular, to a method and apparatus for simulating light. Still more particularly, the present disclosure relates to a method and apparatus for simulating light for use in testing solar cells.

2. Background

Solar energy systems convert light into electrical energy. For example, a solar energy system may use solar cells to generate electricity. The solar cells may be referred to as photovoltaic cells. A solar energy system may be used in different environments. For example, a solar energy system may be used in space, on land, in the air, and in other locations.

A solar cell includes semiconducting materials that absorb photons in sunlight. These photons may excite electrons and cause a current to flow through a semiconducting material. A solar cell may be evaluated based on its efficiency. The overall efficiency of a solar cell may be based on various parameters, such as reflectance efficiency, thermodynamic efficiency, charge carrier separation efficiency, conductive efficiency, or other types of efficiencies.

These efficiencies may be evaluated based on the environment in which a solar cell is to be used. For example, a solar cell designed for use in outer space may be different from one designed for use on the earth at sea level. The designs of solar cells may be tested through simulating the environment in which the solar cell will be used.

Therefore, it would be desirable to have a method and apparatus that take into account at least some of the issues discussed above, as well as other possible issues.

SUMMARY

In one illustrative embodiment, a method for simulating light is provided. A first light from a first filterer is output to a solar cell. The first light output by the first filterer has a coarse spectrum that simulates the light in a selected environment. A second light from a second filterer is output to the solar cell while the first light is output by the first filterer. The second light output by the second filterer has a fine spectrum selected for a group of junctions in the solar cell.

In another illustrative embodiment, an apparatus comprises a first filterer and a second filterer. The first filterer is configured to output a first light from the first filterer to a solar cell. The first light has a coarse spectrum that simulates the light in a selected environment. The second filterer is configured to output a second light from the second filterer to the solar cell while the first light is output by the first filterer. The second light output by the second filterer has a fine spectrum selected for a group of junctions in the solar cell.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a second group of filters in accordance with an illustrative embodiment;

FIG. 7 is an illustration of graphs for wavelengths for bands of light output from a second group of filters in accordance with an illustrative embodiment;

DETAILED DESCRIPTION

The illustrative embodiments recognize and take into account one or more different considerations. For example, the illustrative embodiments recognize and take into account that many solar cells have multiple junctions. In other words, a solar cell with multiple junctions may generate currents at different wavelengths. Different junctions in the solar cell may generate currents in response to different ranges of wavelengths in light.

The illustrative embodiments recognize and take into account that testing a solar cell with multiple junctions for a specific environment involves reproducing the light encountered by the solar cell in that specific environment. For example, a solar cell for use in space may be different from a solar cell for use on the earth. Light transmitted through space does not travel through any atmosphere, as opposed to light transmitted to the earth. Further, the light transmitted to the earth may vary based on the amount of atmosphere that the light travels through. The atmosphere absorbs some of the wavelengths of light. As the light travels through more of the atmosphere, more of the light is absorbed. For example, the light from directly overhead travels through less atmosphere than light traveling at an angle, such as 30 degrees.

The illustrative embodiments recognize and take into account that currently used light simulation systems may roughly reproduce the wavelengths in the environment. These light simulation systems, however, may not provide a desired level of accuracy in reproducing the ranges of wavelengths and intensities of those wavelengths for testing the junctions within a solar cell.

As a result, the embodiments recognize and take into account that testing a solar cell with multiple junctions may not be as accurate as desired. Thus, the embodiments provide a method and apparatus for testing solar cells. Thus, the method and apparatus may be applied to testing solar cells with more than one junction.

In one illustrative embodiment, a method for simulating light is present. The simulation of light in the illustrative examples involves the actual generation of light as opposed to a software simulation. In other words, the simulation is a "physical simulation" rather than a "software simulation" that is run on a computer. A first light is output from a first filterer to a solar cell. The first light has a coarse spectrum that simulates the light in a selected environment. A second light is output from a second filterer to a solar cell while the first light is output by the first filterer, wherein the second light output by the second filterer has a fine spectrum selected for a group of junctions in the solar cell.

Figure 1:
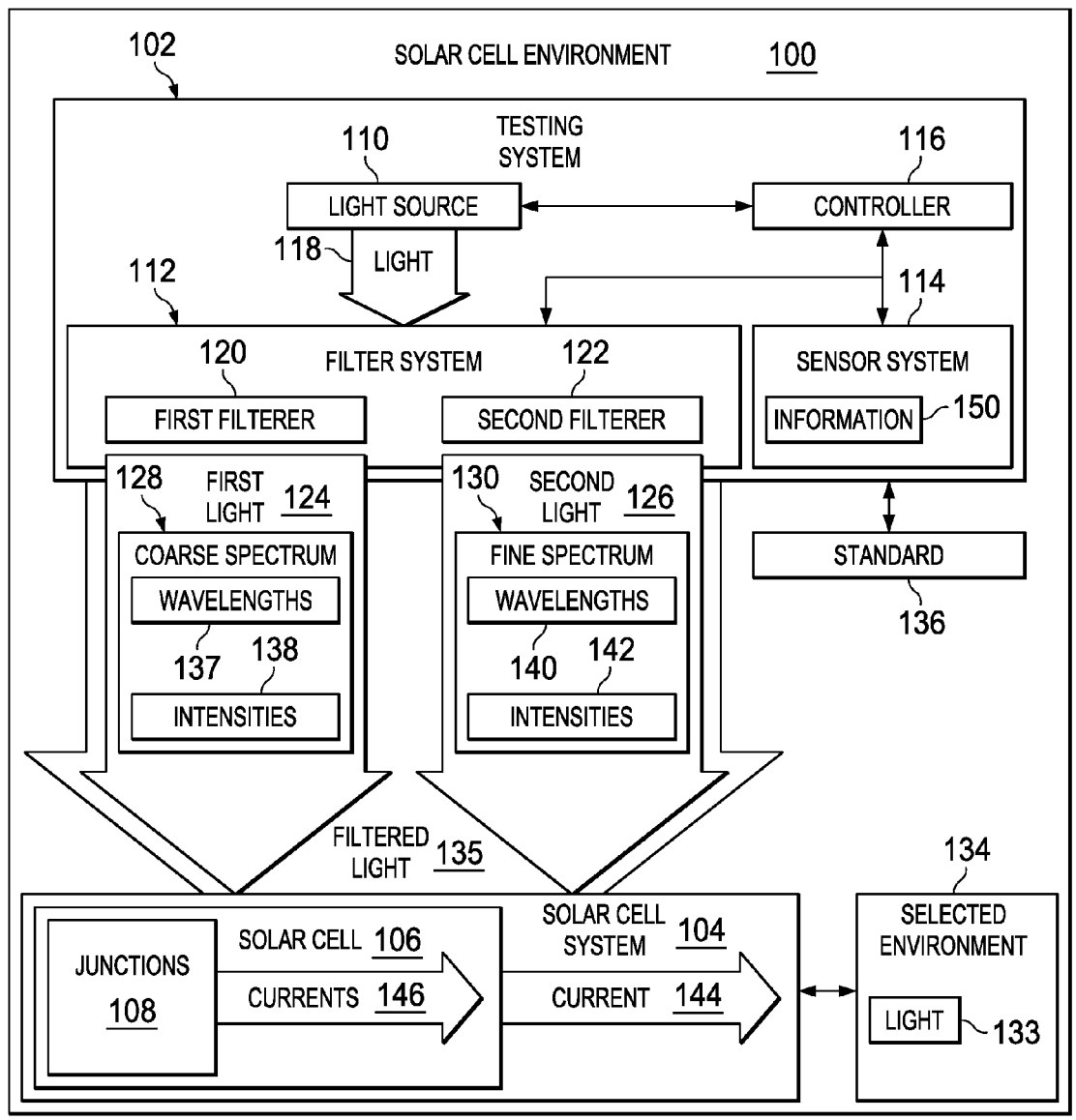
FIG. 1 is an illustration of a block diagram of a solar cell environment in accordance with an illustrative embodiment.

With reference now to the figures and, in particular, with reference to FIG. 1, an illustration of a block diagram of a solar cell environment 100 is depicted in accordance with an illustrative embodiment.

In this illustrative example, a testing system 102 is used to test a solar cell system 104. In particular, the testing system 102 may be used to test a solar cell 106 in the solar cell system 104.

In this illustrative example, the solar cell 106 has a group of junctions 108. As used herein, a "group of," when used with reference to items means one or more items. For example, the group of junctions 108 is one or more junctions 108.

In this illustrative example, the testing system 102 has a number of different components. As depicted, testing system 102 includes a light source 110, a filter system 112, a sensor system 114, and a controller 116. These components are hardware components in the illustrative examples and may include or run software.

In this illustrative example, the light source 110 is configured to generate light 118. The light source 110 may take various forms. For example, the light source 110 may be selected from at least one of a halogen light, a xenon arc lamp, or some other suitable light source.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

As depicted, the light 118 is directed through the filter system 112. In this illustrative example, the filter system 112 is depicted as a first filterer 120 and a second filterer 122. The first filterer 120 outputs a first light 124 to the solar cell 106. The second filterer 122 outputs a second light 126 to the solar cell 106.

In other words, the filter system 112 generates the first light 124 and the second light 126 in response to the light 118 passing through the first filterer 120 and the second filterer 122 in filter system 112.

In these illustrative examples, the first light 124 output by the first filterer 120 has a coarse spectrum 128. The second light 126 output by the second filterer 122 has a fine spectrum 130.

In these illustrative examples, a spectrum is a range of wavelengths of light. A spectrum is described based on the wavelengths and intensities for the wavelengths. In other words, the wavelengths have corresponding intensities. For example, one wavelength in a spectrum may have a different intensity from another wavelength in the spectrum.

The first light 124 with the coarse spectrum 128 simulates a portion of the light 133 in a selected environment 134 in which the solar cell 106 may be used. The second light 126 with the fine spectrum 130 simulates another portion of the light 133 in the selected environment 134. The second light 126 is selected based on the design of the group of junctions 108 in the solar cell 106 that is to be tested.

For example, the first light 124 may have an intensity that is about 80 percent of an intensity in the light 133 being simulated for the selected environment 134. The second light 126 may have an intensity that is about 20 percent of the intensity in the light 133 being simulated for the selected environment 134. Together, the first light 124 and the second light 126 generated by the filter system 112 form a filtered light 135 with the desired intensities to simulate the light 133 for the selected environment 134.

In other words, the light 118 from the light source 110 is adjusted to simulate characteristics of the light 133 in the selected environment 134. The selected environment 134 may be selected from one of outer space, a selected elevation on land, or some other location. In the illustrative examples, the selected environment 134 may be one based on a standard, a specification for the solar cell 106, some other source, or some combination thereof. For example, the other source may be selections made by an operator to perform a test on the solar cell 106.

The first light 124 output by the first filterer 120 has the coarse spectrum 128 that simulates the light 118 in the selected environment 134. The second light 126 output by the second filterer 122 has the fine spectrum 130 selected for the group of junctions 108 in the solar cell 106.

As depicted, the coarse spectrum 128 may be selected based on a standard 136. The standard 136 sets out rules for testing solar cell 106. In other words, the first light 124 is required to meet the standard 136 in the illustrative examples.

As depicted, the standard 136 is one or more rules that specify characteristics such as the wavelengths 137 and the intensities 138 for the light 133 in the selected environment 134 for testing the solar cell 106. In these illustrative examples, each wavelength in the wavelengths 137 has an intensity in the intensities 138 that corresponds to that wavelength.

In the illustrative example, the fine spectrum 130 in the second light 126 is selected for the group of junctions 108 in solar cell 106. In other words, the wavelengths 140 and the intensities 142 in fine spectrum 130 are selected to cause the solar cell 106 to generate current 144. In these illustrative examples, current 144 is based on a group of currents 146 generated by the group of junctions 108 in response to the second light 126.

In the illustrative example, the filtered light 135 illuminates solar cell 106. The filtered light is formed by the first light 124 and the second light 126. The first light 124 is generated to meet the standard 136 for testing solar cell 106. As depicted, the first light 124 is about 80 percent to about 90 percent of the filtered light 135 and meets the standard 136 or substantially meets the standard 136 for the selected environment 134.

In the illustrative examples, the second light 126 is selected to test the group of junctions 108 in the solar cell 106. In other words, the wavelengths 137 and the intensities 138 in the fine spectrum 130 for the second light 126 are selected to cause the group of junctions 108 in the solar cell 106 to generate the group of currents 146 that forms the current 144 generated by the solar cell 106. In this example, the second light 126 is about 10 percent to about 20 percent of the filtered light 135 that illuminates the solar cell 106.

In particular, the wavelengths 140 and the intensities 142 in the fine spectrum 130 for the second light 126 may be selected based on the specifications or characteristics for the solar cell 106. In particular, the intensities 142 of the wavelengths 140 may be selected or picked based on the characteristics of the group of junctions 108 in the solar cell 106. As a result, different solar cells with different designs from the solar cell 106 in the solar cell system 104 in this example may result in different selections for the intensities 142 of the wavelengths 140 in the second light 126.

In this manner, the filtered light 135 may meet the standard 136. Further, the filtered light 135 also may provide for desired testing of the group of junctions 108 in the solar cell 106.

In the illustrative example, the sensor system 114 is configured to generate information 150. The information 150 may be about at least one of the solar cell system 104, the solar cell 106, the light source 110, the filter system 112, or the solar cell environment 100. For example, the sensor system 114 may be configured to generate the information 150 about a response of the group of junctions 108 in the solar cell 106 to at least one of the first light 124 or the second light 126. The information 150 may be used to analyze the performance of at least one of the solar cell 106, the group of junctions 108, a particular junction in the group of junctions 108, the filtering system, the light source 110, or other suitable components.

As depicted, the controller 116 is configured to control operations of the components in the testing system 102. Also, the controller 116 may be configured to select a configuration for at least one of the first filterer 120 or the second filterer 122. Additionally, the controller 116 may perform analysis of the information 150.

In the illustrative example, the controller 116 may be implemented in software, hardware, firmware or a combination thereof. When software is used, the operations performed by the controller 116 may be implemented in program code configured to run on a processor unit. When firmware is used, the operations performed by the controller 116 may be implemented in program code and data stored in persistent memory to run on a processor unit. When hardware is employed, the hardware may include circuits that operate to perform the operations in the controller 116.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, the controller 116 may control the operation of the light source 110 to generate the light 118. The controller 116 may also control the operation of the filter system 112 to generate the filtered light 135 that illuminates the solar cell 106 in the solar cell system 104. For example, the controller 116 may control the first filterer 120 to generate the first light 124 and the second filterer 122 to generate the second light 126.

In the illustrative example, the controller 116 also may adjust the generation of the first light 124 and the second light 126 during testing of the solar cell 106. In other words, these adjustments may be made dynamically. The adjustments may be made based on the information 150 received from the sensor system 114.

For example, the second light 126 may be adjusted. In particular, the wavelengths 140 and the intensities 138 may be adjusted based on the current 144 from the solar cell 106 or group of currents from the group of junctions 108 in the solar cell 106. In one illustrative example, the wavelengths 140 and the intensities 142 in the second light 126 may be adjusted to identify what levels are present for at least one of the current 144 for the solar cell 106 or one or more of the group of currents 146 for the group of junctions 108.

For example, the wavelengths 140 and the intensities 138 in the second light 126 may be changed to see how the group of currents 146 generated by the group of junctions 108 are affected. The wavelengths 140 and the intensities 142 in the second light 126 may be changed to see the level of a current in the group of currents 146 generated by a junction in the group of junctions 108. This level may be compared to other levels of current in the group of currents 146 to analyze the performance of the group of junctions 108 in the solar cell 106.

Figure 2:
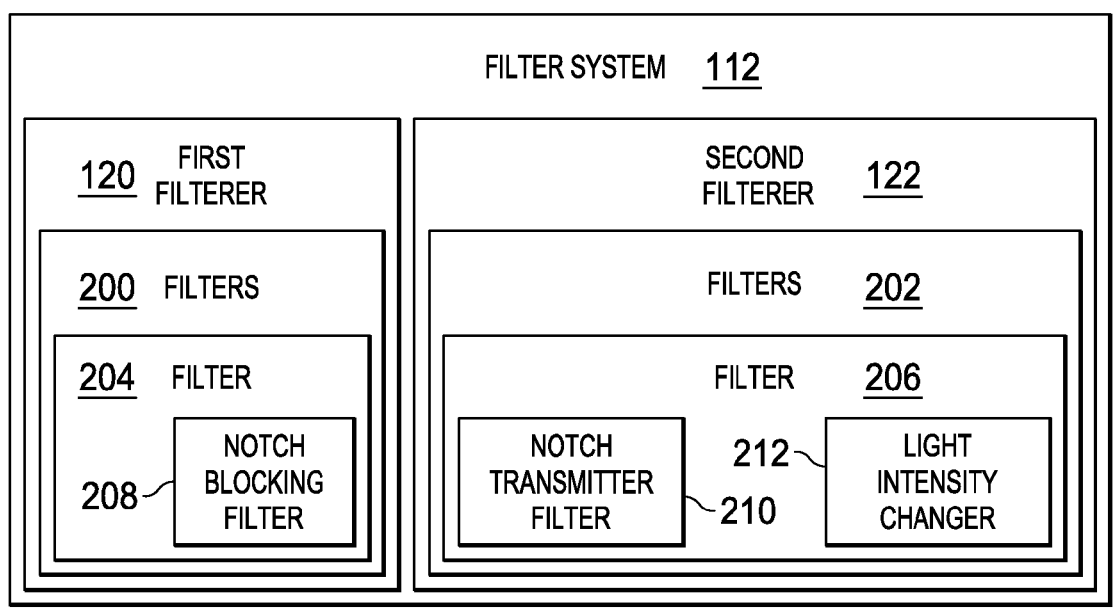
FIG. 2 is a more detailed illustration of a block diagram of a filter system in accordance with an illustrative embodiment.

With reference now to FIG. 2, a more detailed illustration of a block diagram of the filter system 112 is depicted in accordance with an illustrative embodiment. In this block diagram, the first filterer 120 and the second filterer 122 include a number of different components.

As depicted, the first filterer 120 has a first group of filters 200. The second filterer 122 has a second group of filters 202.

In this illustrative example, the first group of filters 200 are selected for the first filterer 120 in the filter system 112 such that the first light 124 with the coarse spectrum 128 has wavelengths 137 and intensities 138 for the light 133 in the selected environment 134 shown in block form in FIG. 1.

The first light 124 generated by the group of filters 200 may control the majority of the filtered light 135 in FIG. 1 used to simulate the light 133 in the selected environment 134. In this example, the majority of the filtered light 135 may be from about 80 percent to about 90 percent of the filtered light 135.

As depicted, the second group of filters 202 for the second filterer 122 are selected to output the second light 126 with a fine spectrum 130 having a group of wavelengths 140 and intensities 142 selected for the group of junctions 108 in the solar cell 106 shown in block form in FIG. 1. The second light 126 is about 10 percent to about 20 percent of the filtered light 135.

In these illustrative examples, the first group of filters 200 and the second group of filters 202 may be implemented using different types of filters. A filter 204 in the first group of filters 200 for use in the first filterer 120 and a filter 206 in the second group of filters for use in the second filterer 122 are optical filters. The filter 204 and the filter 206 are comprised of an optical material in this example.

The filter 204 in the first group of filters 200 may be selected such that the filter 204 in the first group of filters 200 passes most of the light 118 and blocks out a portion of the light 118 from the light source 110 shown in block form in FIG. 1. The filter 204 may pass more of the light 118 than it blocks.

As depicted, the filter 204 may be implemented using a notch blocking filter 208. In this manner, extra portions of the light 118 from the light source 110 needed in the coarse spectrum 128 may be reflected out or blocked.

A filter 206 in the second group of filters 202 may be selected such that the filter 206 in the second group of filters filters the light 118 from the light source 110. The filtering may be performed by the filter 206 such that only the portion of the light 118 for a specific junction in the group of junctions 108 that is sensitive to the portion of the light 118 passes through the filter 206. In other words, each filter in the second group of filters 202 may be selected to pass portions of the light 118 from the light source 110 that correspond to a particular junction in the group of junctions 108 in the solar cell 106.

Thus, the filter 206 may be selected for transmitting the portion of the second light 126 for a particular junction in the group of junctions 108. In this manner, unwanted portions of the light 118 from the light source 110 may be blocked to form the second light 126 in a manner that allows for adjusting the group of currents 146 in FIG. 1 generated by the group of junctions 108 in the solar cell 106.

In the illustrative example, the filter 206 may be implemented using a notch transmission filter 210. A notch transmission filter 210 transmits only specific ones of the wavelengths 140. Other portions of the wavelengths 140 are reflected and not allowed to pass through the notch transmission filter 210 in the illustrative example. For example, the notch transmission filter 210 may transmit less than about 5 percent of light 118 having a wavelength from about 300 nm to about 674 nm. The notch transmission filter 210 may transmit about 95 percent or more of the light 118 having a wavelength from about 674 nm to about 1100 nm. The notch transmission filter 210 may transmit less than about 5 percent of the light 118 having a wavelength from about 1100 nm to about 1800 nm. In other illustrative examples, other filters in the group of filters 202 may have other transmission parameters.

Additionally, filter 206 also may include a light intensity changer 212 in addition to being comprised of an optical material. The light intensity changer 212 is a physical device configured to change intensity of a portion of the second light 126 transmitted by the filter 206. The light intensity changer 212 may be selected from one of an iris, a diaphragm, a neutral density filter, or some other suitable device. In these illustrative examples, the intensity may be changed with the controller 116 shown in FIG. 1 controlling the light intensity changer 212. In other illustrative examples, another operator such as a human operator may control the light intensity changer 212.

As a result, adjusting a particular current in the group of currents 146 may be performed through selection of the filter 206 for a particular junction in the group of junctions 108. These types of adjustments may be used to adjust the particular current without modifying other currents in the group of currents 146 generated by other junctions in the group of junctions 108. These types of adjustments may allow for the generation of information 150 from FIG. 1 for a desired analysis of solar cell 106.

In these illustrative examples, the filters in first group of filters 200 and the filters in the second group of filters 202 may be changed by a human operator. In other illustrative examples, the filters in the first group of filters 200 and the filters in the second group of filters 202 may be changed under the control of the controller 116.

The illustration of the solar cell environment 100 and the different components in this environment in FIGS. 1 and 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the testing system 102 may include other components in addition to, or in place of, the ones depicted in FIGS. 1 and 2. For example, the testing system 102 may include other optics or device. In one illustrative example, a lens may be used to direct the filtered light 135 to the solar cell 106. Other components such as a prism, a mirror, or other suitable devices also may be used to direct the filtered light 135 to the solar cell 106. In other examples, lenses, prisms, mirrors, or other devices may be used to direct the light 118 from the light source 110 to the filter system 112.

As another example, although the light intensity changer 212 is shown as being part of the filter 206, in other illustrative examples, light intensity changer 212 may be a separate component that is considered to be part of the filter 206. In yet another illustrative example, a mechanism such as robotic arms or other devices may be used to change out the filters in first group of filters 200 and the filters in the second group of filters 202 instead of changes being made by a human operator. These devices may be under the control of the controller 116 in these illustrative examples.

Figure 3:
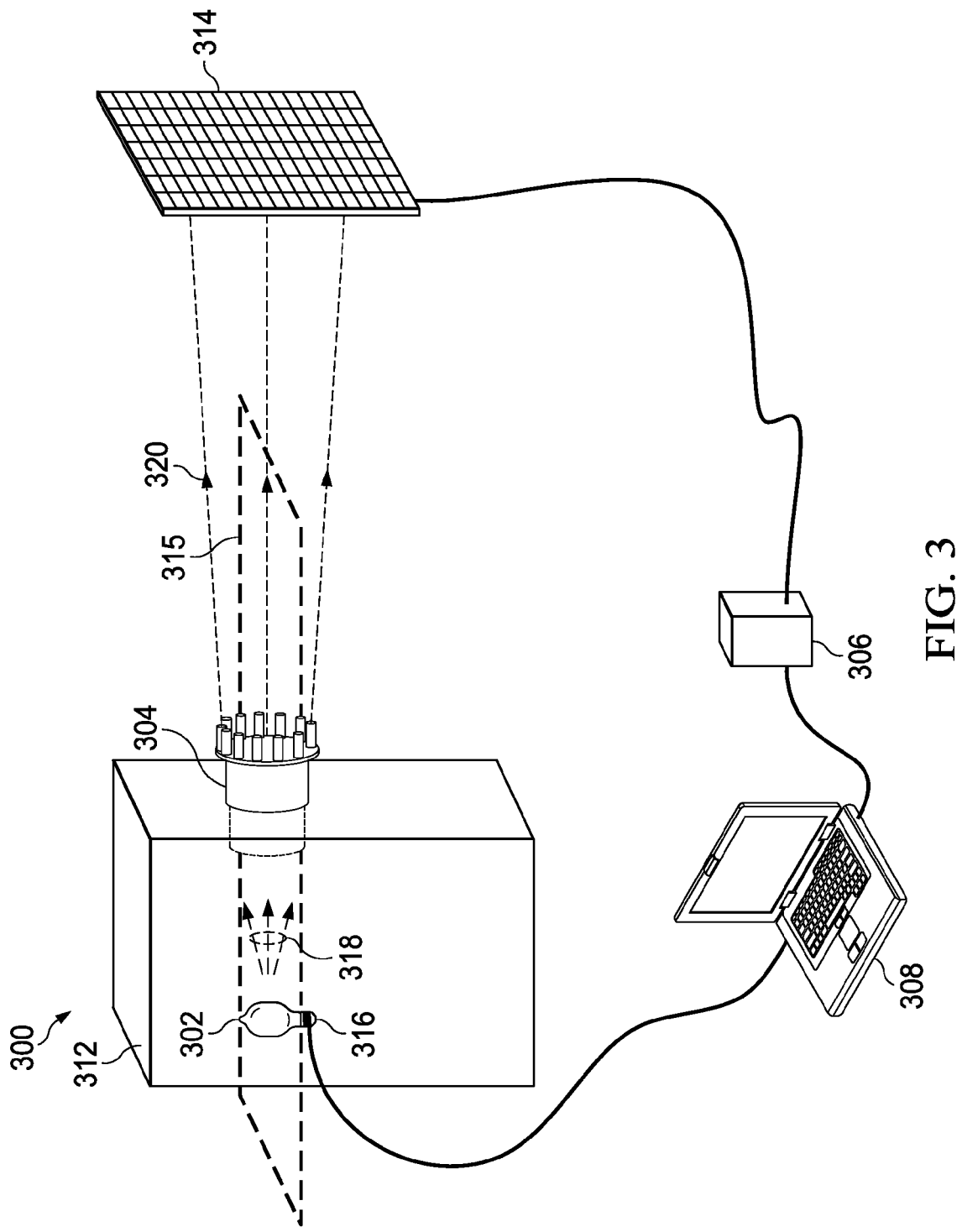
FIG. 3 is an illustration of a testing system in accordance with an illustrative embodiment.

Turning now to FIG. 3, an illustration of a testing system 300 is depicted in accordance with an illustrative embodiment. The testing system 300 is an example of one physical implementation for the testing system 102 shown in block form in FIG. 1.

In this illustrative example, the testing system 300 includes a number of different components. As depicted, the testing system 300 includes a light source 302, a filter system 304, a current detector 306, a computer 308, and a housing 312. The light source 302 and the filter system 304 are examples of physical implementations for the light source 110 and the filter system 112 shown in block form in FIG. 1. The current detector 306 is an example of a physical implementation for the sensor system 114 shown in block form in FIG. 1. The computer 308 is an example of a physical implementation for the controller 116 shown in block form in FIG. 1. The testing system 300 is used to simulate light 318 for testing solar cell 314.

As depicted, the housing 312 holds the light source 302 and the filter system 304. In this illustrative example, the filter system 304 is on a plane of light 315 extending from the light source 302 to the solar cell 314. In this illustrative example, the light source 302 and a portion of the filter system 304 within the housing 312 are shown in phantom to illustrate their locations inside of the housing 312.

The light source 302 takes the form of a halogen lamp 316. The light source generates light 318 that passes through filter system 304 to generate the filtered light 320. The filtered light 320 is directed to the solar cell 314 from the filter system 304 in the housing 312.

Figure 4:
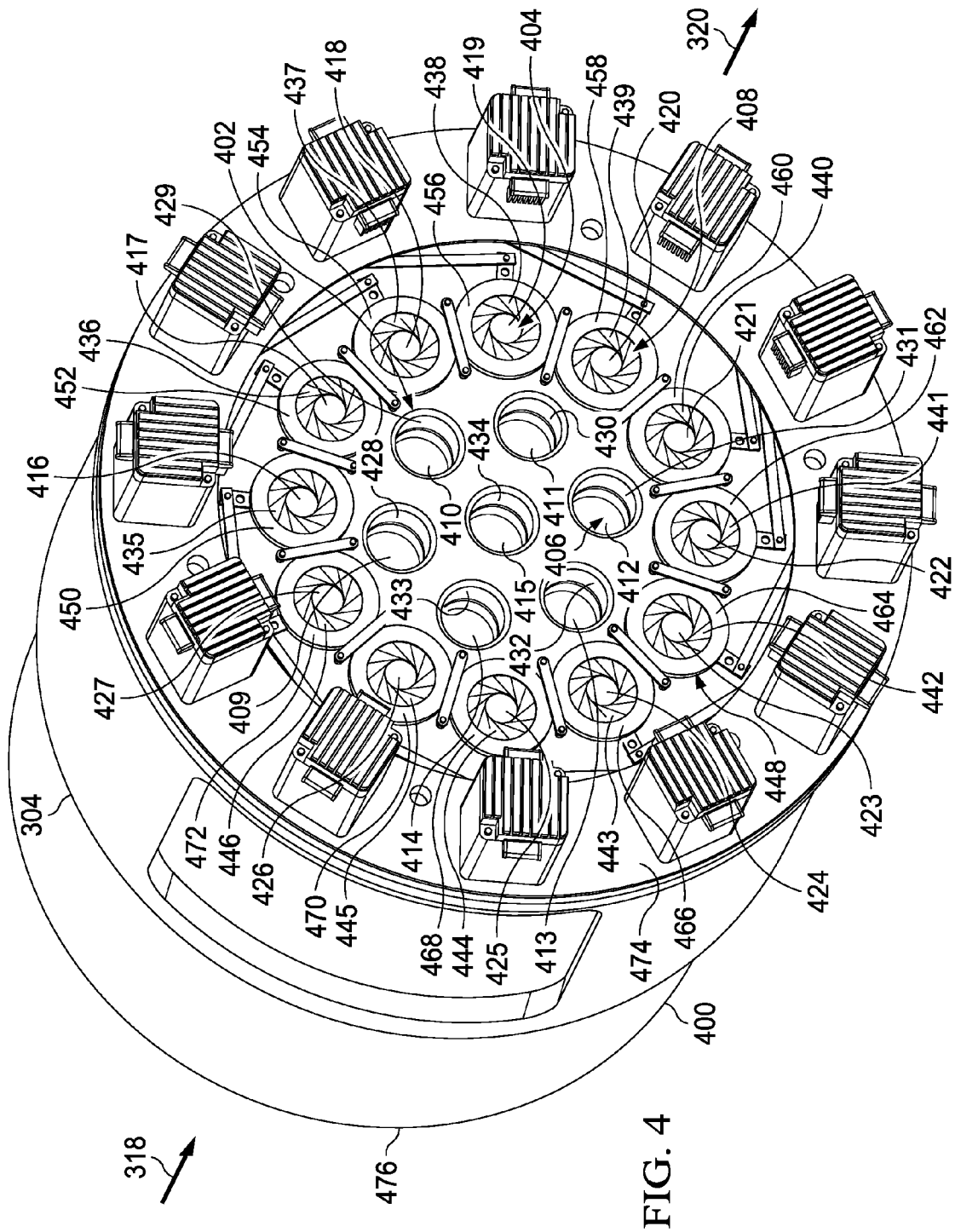
FIG. 4 is an illustration of a filter system in accordance with an illustrative embodiment.

With reference next to FIG. 4, an illustration of a filter system 304 is depicted in accordance with an illustrative embodiment. In this example, a more detailed view of the filter system 304 in FIG. 3 is shown.

As seen in this illustrative example, the filter system 304 includes a filter housing 400. As shown in this example, the filter housing 400 includes first slots 402 and second slots 404. The first slots 402 are configured to hold a first group of filters 406, and the second slots 404 are configured to hold a second group of filters 408.

As shown in this illustrative example, the first slots 402 include a first slot 409, a second slot 410, a third slot 411, a fourth slot 412, a fifth slot 413, a sixth slot 414, and a seventh slot 415. The second slots 404 include a first slot 416, a second slot 417, a third slot 418, a fourth slot 419, a fifth slot 420, a sixth slot 421, a seventh slot 422, an eighth slot 423, a ninth slot 424, a tenth slot 425, an eleventh slot 426, and a twelfth slot 427.

In this illustrative example, the first group of filters 406 includes a first filter 428, a second filter 429, a third filter 430, a fourth filter 431, a fifth filter 432, a sixth filter 433, and a seventh filter 434. The second group of filters 408 includes a first filter 435, a second filter 436, a third filter 437, a fourth filter 438, a fifth filter 439, a sixth filter 440, a seventh filter 441, an eighth filter 442, a ninth filter 443, a tenth filter 444, an eleventh filter 445, and a twelfth filter 446.

In this example, the first group of filters 406 are notch blocking filters. The second group of filters 408 are notch transmission filters.

As can be seen in this illustrative example, irises 448 cover the second group of filters 408. The irises 448 includes a first iris 450, a second iris 452, a third iris 454, a fourth iris 456, a fifth iris 458, a sixth iris 460, a seventh iris 462, an eighth iris 464, a ninth iris 466, a tenth iris 468, an eleventh iris 470, and a twelfth iris 472. In some illustrative examples, the irises 448 may be physically associated with the second group of filters 408 instead of being part of the housing 400.

As can be seen, the light 318 enters the filter system 304 at the first end 476 of the housing 400. The light 318 becomes filtered light 320 after passing through the first group of filters 406 and the second group of filters 408 and is transmitted at the second end 474.

Figure 5:
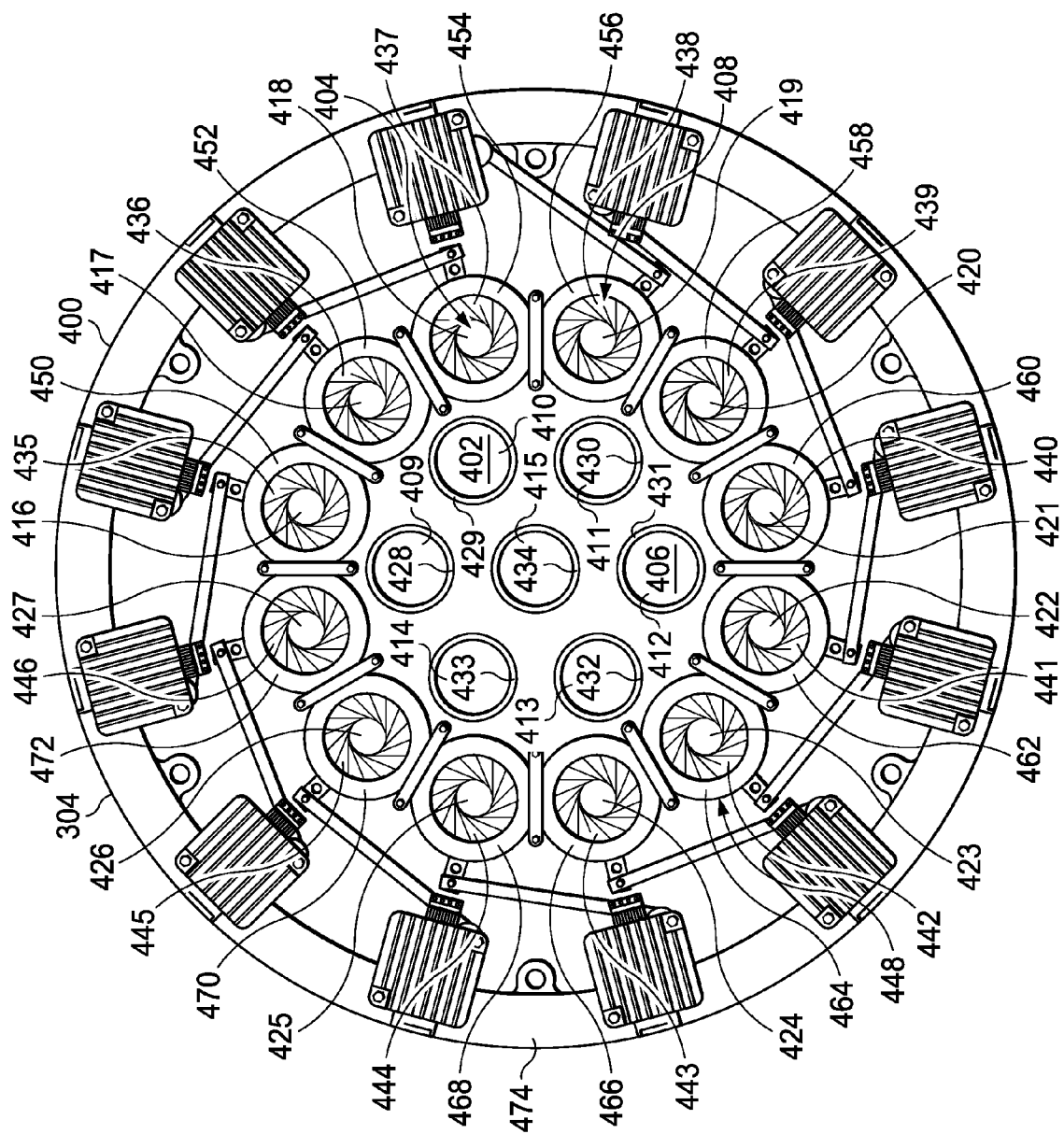
FIG. 5 is an illustration of a second end of a filter system in accordance with an illustrative embodiment.

Turning next to FIG. 5, an illustration of the second end 474 of the filter system 304 is depicted in accordance with an illustrative embodiment. In this example, a view of the second end 474 of the filter system 304 from FIG. 4 is shown.

In the illustrative example, not all of the first slots 402 and the second slots 404 may be filled by the first group of filters 406 and the second group of filters 408. The first group of filters 406 and the second group of filters 408 are added to the first slots 402 and the second slots 404 as needed to match a standard or other requirement. Thus, only particular ones of the first group of filters 406 and the second group of filters 408 are used to modify wavelengths as needed. Also, more than one filter in the first group of filters 406, the second group of filters 408, or both may be located in a slot in the first slots 402 and the second slots 404, depending on the implementation.

With reference now to FIG. 6, an illustration of the second group of filters 408 from FIG. 4 is depicted in accordance with an illustrative embodiment. In this illustrative example, only the second group of filters 408 are shown.

In this illustrative example, the second group of filters 408 in this figure are notch transmission filters. The second group of filters 408 are selected to pass specific bands of light. In the illustrative example, a band of light has a range of wavelengths and a range of intensities. Each wavelength in the range of wavelengths has an intensity in the range of intensities.

The band of light from a filter such as the first filter 435 transmits light that is for a specific junction in a group of junctions in a solar cell. The light in the band of light is selected to cause the solar cell to generate a current.

One or more different ones of the second group of filters 408 in this figure may transmit the same band of light from other filters in the second group of filters 408. For example, the first filter 435, the fourth filter 438, the seventh filter 441, and the tenth filter 444 may all pass the same band of light in the filtered light 320 shown in FIG. 3. In other words, all of these four filters may each transmit the same wavelengths and intensities for a particular junction in the junctions in the solar cell 314. As another example, the second filter 436, the fifth filter 439, the eighth filter 442, and the eleventh filter 445 may all transmit the light with the same band of light in the filtered light 320. In yet another example, the third filter 437, the sixth filter 440, the ninth filter 443, and the twelfth filter 446 may all transmit the same band of light in the filtered light 320.

Turning now to FIG. 7, an illustration of graphs 700 for wavelengths for bands of light output from the second group of filters 408 is depicted in accordance with an illustrative embodiment. The graphs 700 in FIG. 7 illustrate wavelengths for bands of light for the second group of filters 408 in FIG. 6. For example, the first graph 701 represents wavelengths transmitted in a band of light by each of the first filter 435, the fourth filter 438, the seventh filter 441, and the tenth filter 444. The wavelengths shown as being transmitted in the graph 701 are from about 300 nm to about 674 nm.

Next, the second graph 702 represents wavelengths transmitted in a band of light by each of the second filter 436, the fifth filter 439, the eighth filter 442, and the eleventh filter 445. The wavelengths shown as being transmitted in the graph 702 are from about 674 nm to about 890 nm.

The third graph 704 represents wavelengths transmitted in a band of light by each of the third filter 437, the sixth filter 440, the ninth filter 443, and the twelfth filter 446. The wavelengths shown as being transmitted in the graph 704 are from about 890 nm to about 1155 nm.

Figure 8:
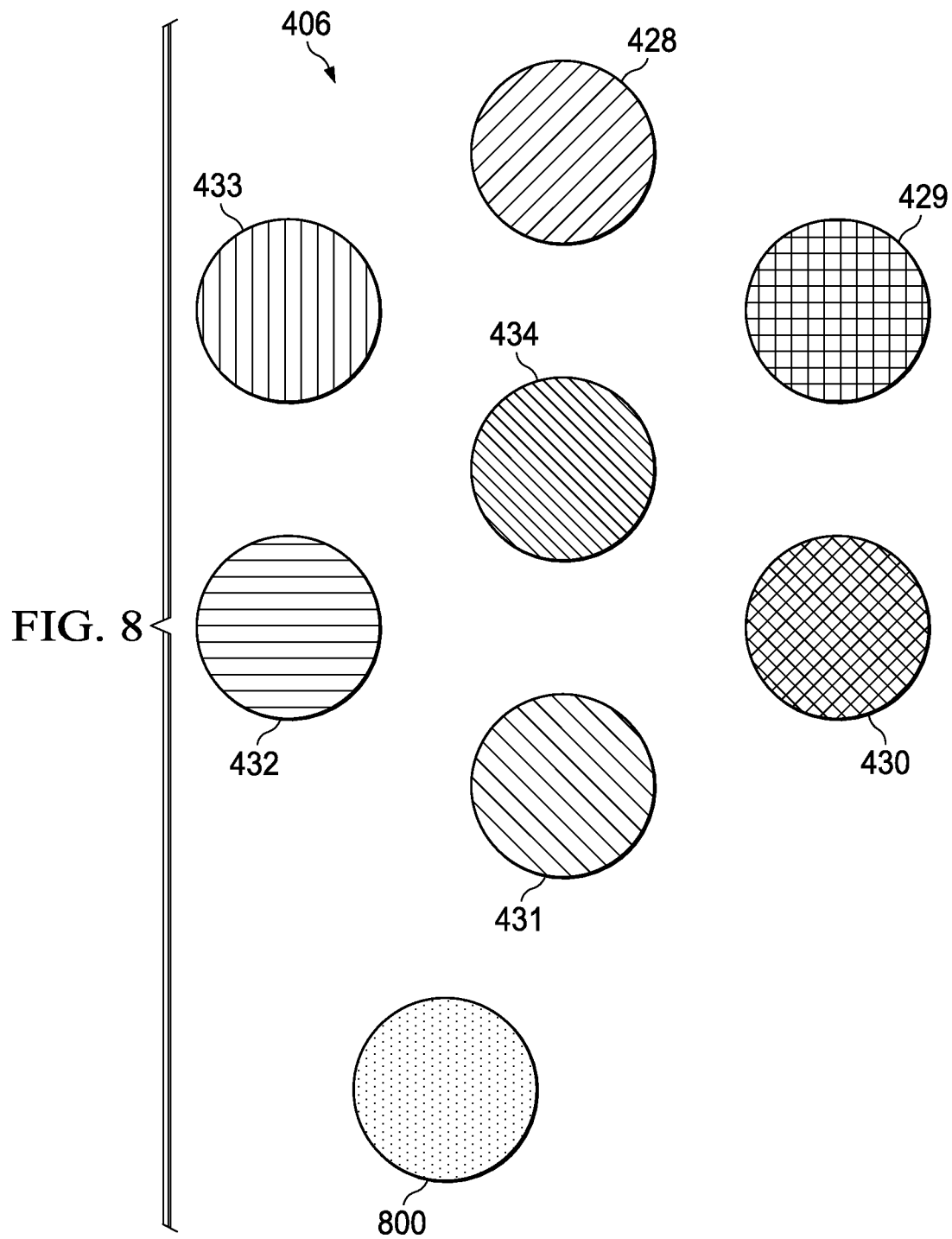
FIG. 8 is an illustration of a first group of filters in accordance with an illustrative embodiment.

With reference now to FIG. 8, an illustration of the first group of filters 406 from FIG. 4 is depicted in accordance with an illustrative embodiment. In this illustrative example, first group of filters 406 is shown in addition to filter 800.

In the illustrative example, the first group of filters 406 and filter 800 are notch blocking filters. The first group of filters 406 and filter 800 are selected to block specific bands of light.

Filter 800 may be stacked on any of the first group of filters 406 to block additional specific bands of light. In other illustrative examples, any filter or filters of the first group of filters 406 may be stacked on any different filter or filters of the first group of filters 406 to block multiple specific bands of light. The band of light from a filter such as the first filter 428 blocks for a specific portion of the coarse spectrum 128 in the light 133 shown in block form in FIG. 1 for the selected environment that is being simulated. In this illustrative example, each filter in the first group of filters 406 is selected to block different bands of light to form the light 133 with the coarse spectrum 128 shown in block form in FIG. 1.

Figure 9:
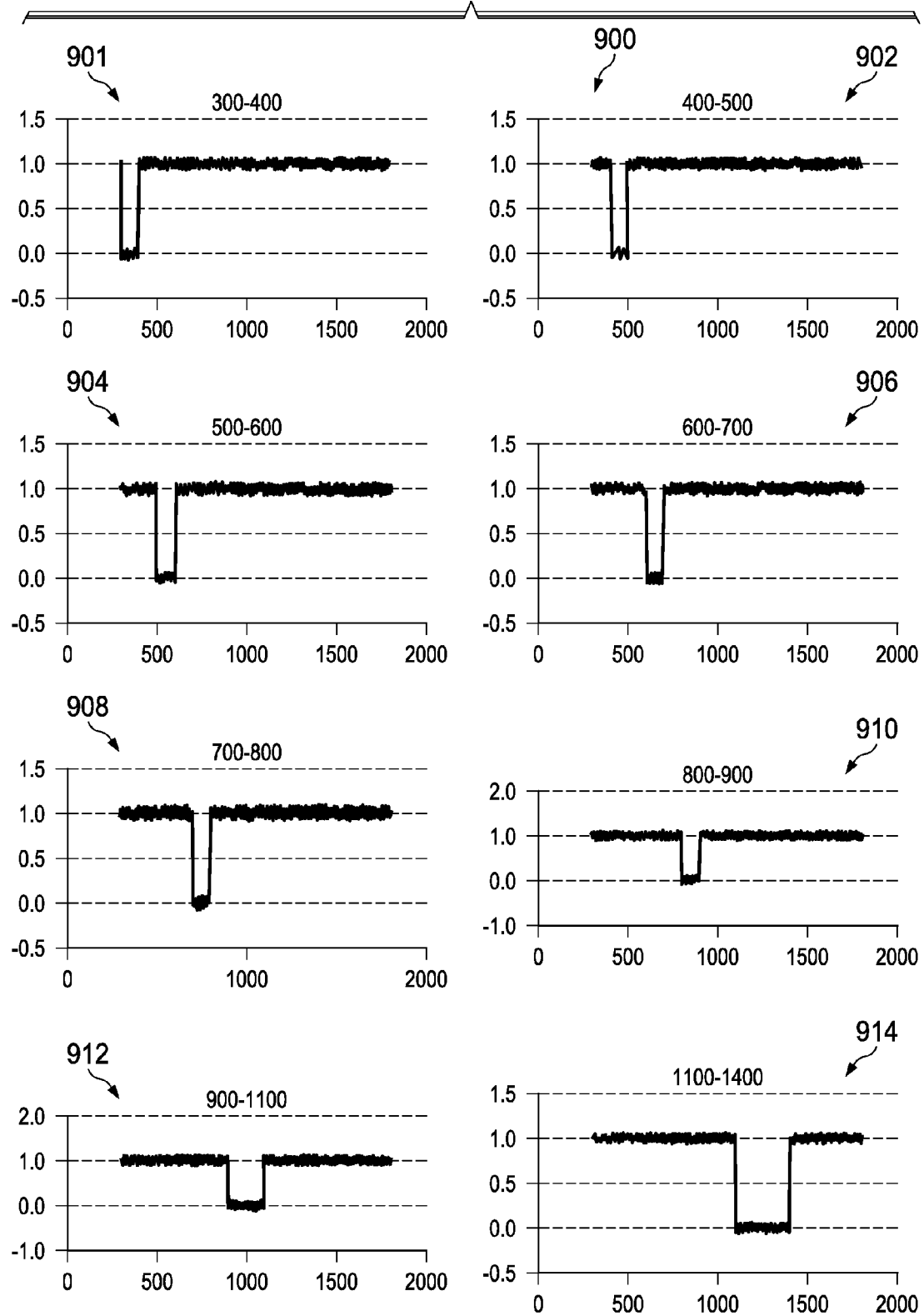
FIG. 9 is an illustration of graphs for wavelengths for bands of light output from a first group of filters in accordance with an illustrative embodiment.

Turning now to FIG. 9, an illustration of graphs 900 for wavelengths for bands of light output from the first group of filters 406 is depicted in accordance with an illustrative embodiment. The graphs 900 in FIG. 9 illustrate wavelengths for bands of light for the first group of filters 406 in FIG. 8.

As depicted, the first graph 901 represents wavelengths blocked in a band of light output by the first filter 428, the second graph 902 in FIG. 9 represents wavelengths blocked in a band of light output by the second filter 429, the third graph 904 represents wavelengths blocked in a band of light output by the third filter 430, the fourth graph 906 represents wavelengths blocked in a band of light output by the fourth filter 431, the fifth graph 908 represents wavelengths blocked in a band of light output by the fifth filter 432, the sixth graph 910 represents wavelengths blocked in a band of light output by the sixth filter 433, the seventh graph 912 represents wavelengths blocked in a band of light output by the seventh filter 434, and the eighth graph 914 represents wavelengths blocked in band of light output by the eighth filter 800.

The illustration of the testing system 300 in FIGS. 3-5, the configurations for the first group of filters 406 and the second group of filters 408 with wavelengths output by the first group of filters 406 and the second group of filters 408 are not meant to imply limitations the manner in which other illustrative examples may be implemented.

For example, the first group of filters 406 may include other numbers of filters 406 other than seven of filters 406. For example, the first group of filters 406 may include three of filters 406, ten of filters 406, or some other number of filters 408. In a similar fashion, the second group of filters 408 also may include other numbers of filters 408 other than the second group of filters 408. For example, the second group of filters 408 may include six of filters 408, twenty of filters 408, or some other number of filters 408.

As another illustrative example, testing system 300 may include other components in addition to, or in place of, the ones illustrated. For example, testing system 300 may include mirrors, lenses, prisms, or other optical devices used for directing, adjusting, or performing other operations on at least one of the light 318 or the filtered light 320. Further, in other illustrative examples, the light source 302 may include one or more additional lamps in addition to halogen lamp 316.

The different components shown in FIGS. 5-9 may be combined with components in FIGS. 2-3, used with components in FIGS. 2-3, or a combination of the two. Additionally, some of the components in FIGS. 5-9 may be illustrative examples of how components shown in block form in FIGS. 2-3 can be implemented as physical implementations.

Figure 10:
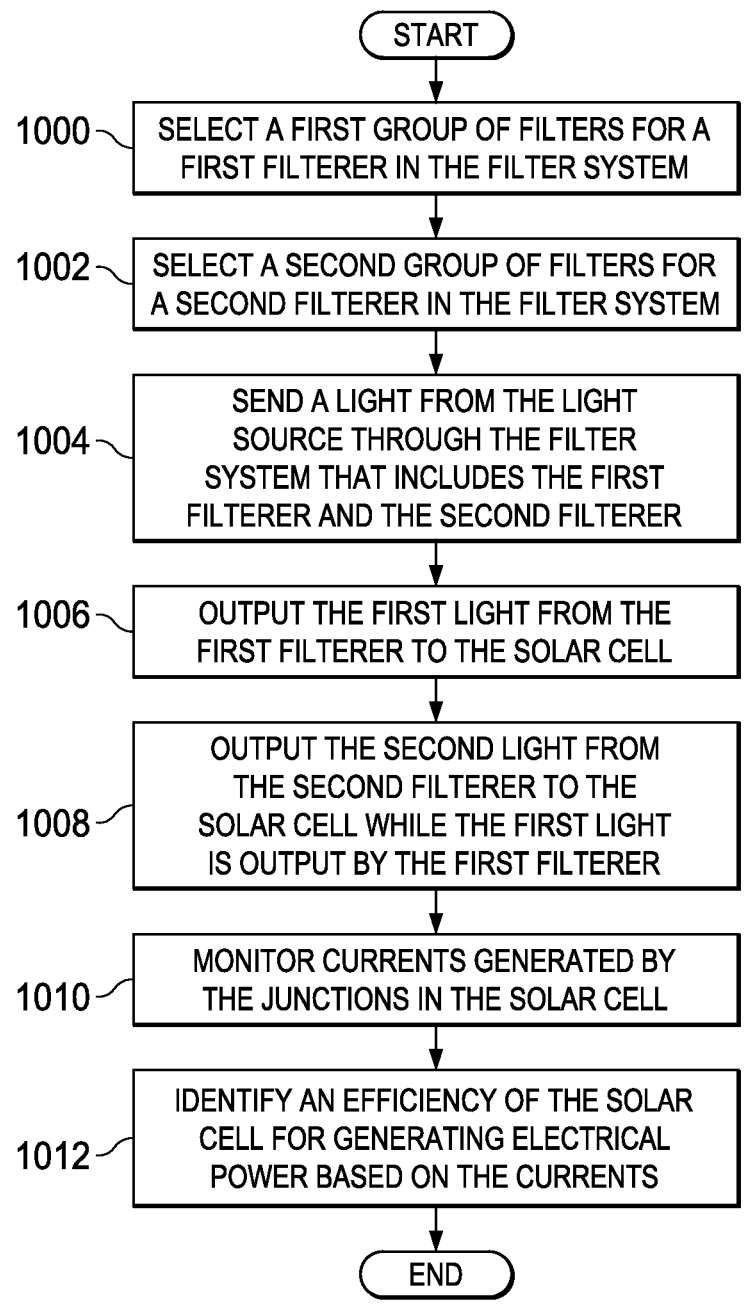
FIG. 10 is an illustration of a flowchart of a process for testing a solar cell in accordance with an illustrative embodiment.

With reference next to FIG. 10, an illustration of a flowchart of a process for testing the solar cell 106 is depicted in accordance with an illustrative embodiment. The process illustrated in FIG. 10 may be implemented in the solar cell environment 100 in FIG. 1. In particular, the different operations in this flowchart may be performed using the testing system 102 to perform on the filter system 112.

The process begins by selecting a first group of filters 200 for a first filterer 120 in the filter system 112 (operation 1000). The first group of filters 200 are configured to output a first light 124 with a coarse spectrum 128 having wavelengths 137 and intensities 138 for the light 133 in the selected environment 134.

The process also selects a second group of filters 202 for a second filterer 122 in the filter system 112 (operation 1002). The second group of filters output the second light 126 with the fine spectrum 130 having a group of wavelengths 140 and intensities 142 selected for a group of junctions 108 in a solar cell 106. Also, the second group of filters 202 may be such that a selected number of the group of junctions 108 in the solar cell 106 generate a group of currents 146.

The process then sends a light 118 from the light source 110 through the filter system 112 that includes the first filterer 120 and the second filterer 122 (operation 1004). The process then outputs the first light 124 from the first filterer 120 to the solar cell 106 (operation 1006). The first light 124 output by the first filterer 120 has the coarse spectrum 128 that simulates the light 133 in the selected environment 134.

The process also outputs the second light 126 from the second filterer 122 to the solar cell 106 while the first light 124 is output by the first filterer 120 (operation 1008). The second light 126 output by the second filterer 122 has a fine spectrum 130 selected for the group of junctions 108 in the solar cell 106.

The process then monitors currents 146 generated by the junctions 108 in the solar cell 106 (operation 1010). In the illustrative example, the monitoring is performed using a sensor system 114. The sensor system 114 includes a current detector.

The process then identifies an efficiency of the solar cell 106 for generating electrical power based on the currents 146 (operation 1012), with the process terminating thereafter. This process may be repeated a number of times with different configurations for the first group of filters 200, the second group of filters 202, or both.

Figure 11:
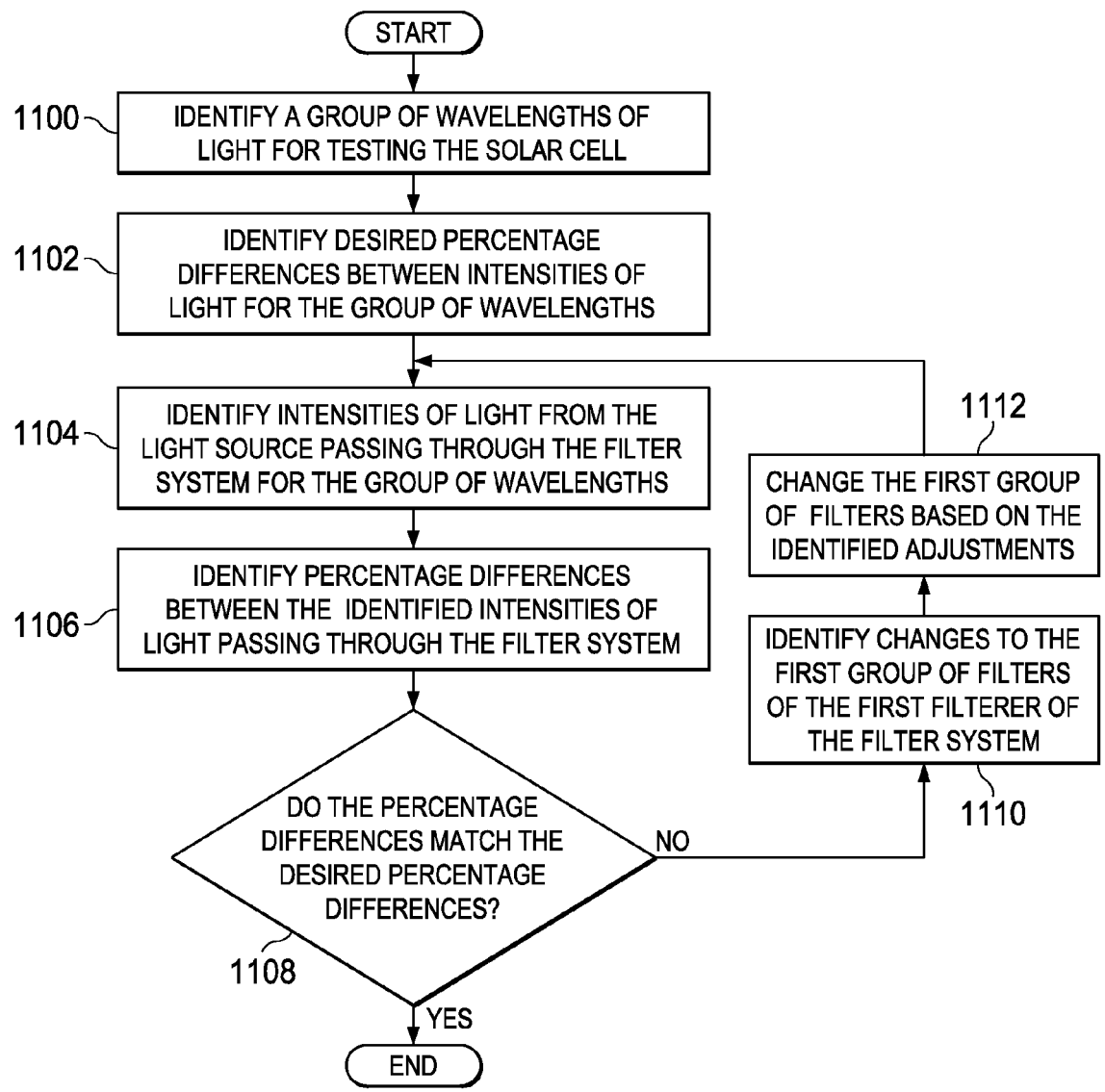
FIG. 11 is an illustration of a flowchart of a process for selecting a first group of filters in accordance with an illustrative embodiment.

With reference now to FIG. 11, an illustration of a flowchart of a process for selecting the first group of filters 200 is depicted in accordance with an illustrative embodiment. This process may be used to select filters 200 for use in the first filterer 120 in filter system 112. The process illustrated in FIG. 11 may be implemented in the solar cell environment 100 in FIG. 1. In particular, the different operations in this flowchart may be performed using the testing system 102 in FIG. 1 to select the first group of filters 200 in the filter system 112 shown in block form in FIG. 2.

The process begins by identifying a group of wavelengths of light for testing the solar cell 106 (operation 1100). The group of wavelengths are for simulating the light 133 in the selected environment 134 in this illustrative example. The process also identifies desired percentage differences between intensities of light for the group of wavelengths (operation 1102).

As used herein, a "percentage difference" means a ratio calculated by comparing intensity of light for a wavelength to a baseline intensity. In these illustrative examples, a baseline intensity is a value selected from a first intensity of a first wavelength in the group or any other suitable value. For example, the desired percentage differences may be specified in the standard 136 for testing solar cell 106. The desired percentage differences between intensities of light for the group of wavelengths is an example of the coarse spectrum 128 that simulates the light 118 in the selected environment 134 in FIG. 1.

The process then identifies intensities of the light 118 from the light source 110 passing through the filter system 112 for the group of wavelengths (operation 1104). The process further identifies percentage differences between the identified intensities of light passing through the filter system 112 (operation 1106).

In identifying percentage differences between the identified intensities of light passing through the filter system 112, the process may also calculate band ratios for bands of light within the group of wavelengths. As used herein, "band ratios" are percentage differences between identified intensities of light for ranges of wavelengths within a group of wavelengths. For example, a band ratio for a band of light may be calculated as an average of the calculated percentage differences between the identified intensities of light within the band of light.

A determination is made as to whether the percentage differences match the desired percentage differences (operation 1108). If the percentage differences match the desired percentage differences, the process terminates.

In operation 1108, the determination of whether the percentage differences match the desired percentage differences may be based on whether the percentage differences are the same as the desired percentage differences or within a level of tolerance from desired percentage differences. The level of tolerance for the matching of the percentages may be identified in a number of different ways. For example, the level of tolerance may be identified from the standard 136, an operator of the testing system 102, or some other source.

If the percentage differences do not match the desired percentage differences, the process next identifies changes to the first group of filters 200 of the first filterer 120 of the filter system 112 (operation 1110). These changes are identified to adjust the percentage differences to match the desired percentage differences. The identified changes are calculated based on an amount of difference between the percentage difference and the desired percentage difference. The identified changes are to correct a percentage of excess intensity of light passing through the filter system 112 and a percentage of insufficient light passing through the filter system 112. These changes may also be identified to adjust an amount of difference between the band ratios and desired band ratios within the group of wavelengths.

The process then changes the first group of filters 200 based on the identified adjustments (operation 1112), with the process continuing back to operation 1104 to continue selecting the first group of filters 200. These changes may be made by replacing one or more filters 200 with different filters (not shown). In these illustrative examples, operations 1104-1112 may be repeated a number of times to fine-tune the selection of the first group of filters 200.

An example of how the adjustment may be made includes measuring the light and determining how much power is in each of the specified spectral bands selected. Those numbers may be compared with the specification for testing the solar cell 106. The values for the powers are normalized to a percentage of the total power. If any of the individual bands have a higher value than needed, then percentage of each individual band that is too high of the normalized value is calculated. For example, band 1 may be about 11% high and band 4 may be about 26% high. The appropriate number of blocker filters may then be inserted to get an 11% reduction in band 1 and a 26% reduction in band 4. In this manner, all of the bands that are 'high' are brought down to match the other bands.

Figure 12:
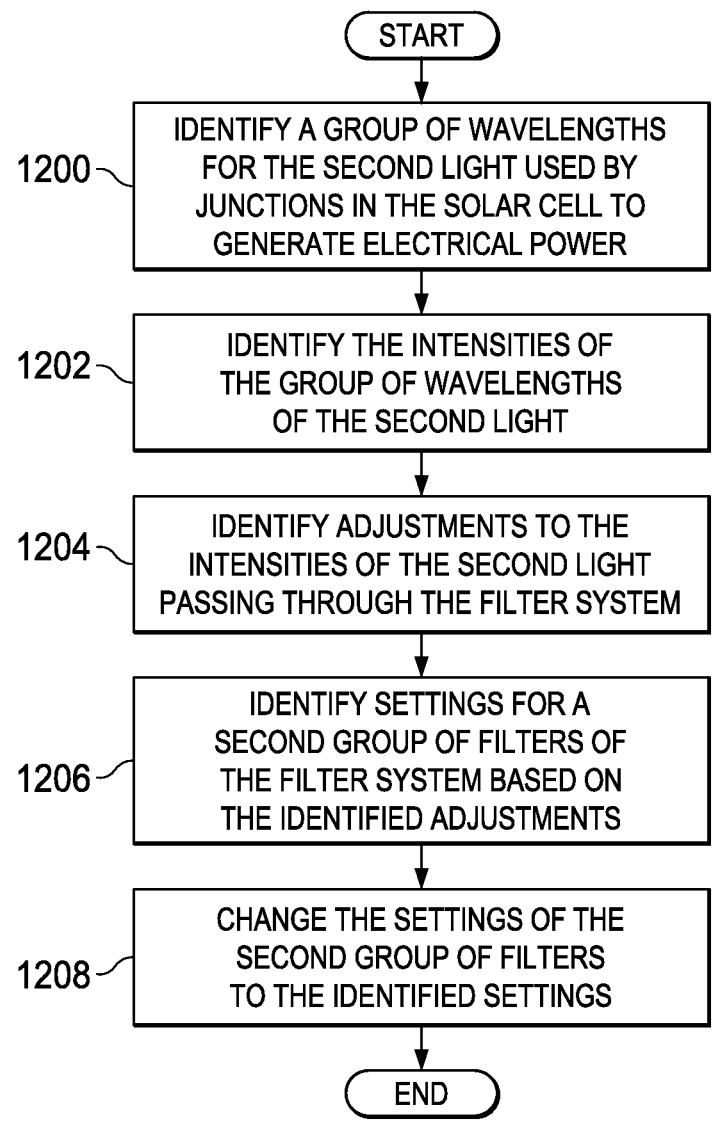
FIG. 12 is an illustration of a flowchart of a process for controlling a second light output by a second group of filters in accordance with an illustrative embodiment.

With reference next to FIG. 12, an illustration of a flowchart of a process for controlling the second light 126 output by the second group of filters 202 is depicted in accordance with an illustrative embodiment. This process may be used to control filters 202 in the second filterer 122 in filter system 112 shown in block form in FIG. 2. The process illustrated in FIG. 12 may be implemented in the solar cell environment 100 in FIG. 1. In particular, the different operations in this flowchart may be performed using the testing system 102 in FIG. 1 to control the second light 126 output by the second group of filters 202 in the second filterer 122.

The process begins by identifying a group of wavelengths 140 for the second light 126 used by junctions 108 in the solar cell 106 to generate electrical power (operation 1200). The process also identifies the intensities 142 of the group of wavelengths 140 of the second light 126 (operation 1202). The process next identifies adjustments to the intensities 142 of the second light 126 passing through filter system 112 (operation 1204).

The process further identifies settings for the second group of filters 202 of the filter system 112 based on the identified adjustments (operation 1206). The process then changes the settings of the second group of filters 202 to the identified settings (operation 1208), with the process terminating thereafter. The settings for the second group of filters 202 may be used to adjust light intensity changers for the second group of filters 202 to control the intensities 142 of the second light 126 output by the second group of filters 202 in FIG. 2.

Operations 1204-1208 may be repeated a number of times to fine-tune control of the second light 126 output by the second group of filters 202 in second filterer 122. For example, operations 1204-1208 may be repeated using a number of disparate settings for light intensity changer 212 to test for changes to currents 146 generated by junctions 108 in FIG. 1.

In FIG. 12, the filters are put into the slots and the irises are initially all closed. A solar cell is placed in the light, and the current from each junction is measured. The process is performed for each junction and the appropriate irises that are associated with each junction are opened as needed, until the current measured for each junction has the desired value. The process then moves from one junction to the next junction and may 'add' current by opening the irises until the value is obtained. Each iris now adds current to only one junction at a time in this example.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. For example in FIG. 10, the process may be repeated with a different second group of filters 202 being selected such that a different number of the group of junctions 108 in the solar cell 106 generate the group of currents 146.

Thus, the illustrative embodiments provide a method and apparatus for simulating light 133 for the selected environment 134 to test a solar cell 106. In the illustrative examples, the first group of filters 200 are specifically designed to match specific bands of light that are specified in a source such as a standard 136 or specification. The second group of filters 202 allow for fast and precise balancing of solar cells, such as the solar cell 106 in the solar cell system 104 in FIG. 1. The second group of filters are used to more finely tune the filtered light 135 output by the filter system 112 that simulates the light 133 for the selected environment 134. Specific configuration for the second group of filters 202 is based on the design of the group of junctions 108 in the solar cell 106. As this design changes for other solar cells, second group of filters 202 also may be changed to allow testing of those other solar cells that may be used in the solar cell system 104 in FIG. 1.

With one or more illustrative embodiments, the amount of light 118 that may be thrown away to balance or obtain a desired spectrum for the filtered light 135 generated by the filter system 112 in the testing system 102 may be reduced. As a result, more of the light 118 from the light source 110 may be used in testing the solar cell 106 in FIG. 1.

In these illustrative examples, the irises 448 are used to adjust the intensities 142 of the second light 126 for the fine spectrum 130 to balance with the intensities 138 of the first light 124 for the coarse spectrum 128. In this manner, the overall intensities for the wavelengths in the overall spectrum for the light 133 simulated using the filtered light 135 may balance between the first light 124 and the second light 126 that form the filtered light 135.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for simulating light, the method comprising:
   outputting a first light from a first filterer to a solar cell, wherein the first light output by the first filterer has a coarse spectrum that simulates the light in a selected environment, wherein the coarse spectrum is selected based on a standard which sets forth rules for testing the solar cell; and
   outputting a second light from a second filterer to the solar cell while the first light is output by the first filterer, wherein the second light output by the second filterer has a fine spectrum selected specifically for a group of junctions in the solar cell to test the group of junctions, wherein the second light output is configured to generate a current in the solar cell, and wherein outputting further comprises operating the first filterer and the second filterer such that the second light spectrum is about 10 percent to about 20 percent of a total light from both the first filterer and the second filterer that illuminates the solar cell.

2. The method of claim 1 further comprising:
   selecting a first group of filters for the first filterer, wherein the first group of filters outputs the first light with the coarse spectrum having wavelengths and intensities for the light in the selected environment.

3. The method of claim 1 further comprising:
   selecting a second group of filters for the second filterer, wherein the second group of filters outputs the second light with the fine spectrum having a group of wavelengths and intensities selected for the group of junctions in the solar cell.

4. The method of claim 1, wherein the selected environment is selected from one of outer space and a selected elevation on land.

5. The method of claim 2, wherein a filter in the first group of filters is a notch blocking filter.

6. The method of claim 3, wherein a filter in the second group of filters is a notch transmission filter.

7. The method of claim 3, wherein a filter in the second group of filters comprises an optical material and a light intensity changer configured to change an intensity of the light passing through the filter.

8. The method of claim 3, wherein the selecting step comprises:
   selecting the second group of filters for the second filterer such that a selected number of the group of junctions in the solar cell generate a group of currents.

9. The method of claim 3 further comprising:
   selecting a different second group of filters such that a different number of the group of junctions in the solar cell generate a group of currents.

10. The method of claim 7, wherein the light intensity changer is selected from one of an iris, a diaphragm, and a neutral density filter.

11. An apparatus comprising:
    a first filterer configured to output a first light from the first filterer to a solar cell, wherein the first light has a coarse spectrum that simulates light in a selected environment wherein the coarse spectrum is selected based on a standard which sets forth rules for testing the solar cell; and
    a second filterer configured to output a second light from a second filterer to the solar cell while the first light is output by the first filterer, wherein the second light output by the second filterer has a fine spectrum selected specifically for a group of junctions in the solar cell to test the group of junctions, wherein the second light output is configured to generate a current in the solar cell, and wherein the first filterer and the second filterer are configured such that the second light spectrum is about 10 percent to about 20 percent of a total light from both the first filterer and the second filterer that will illuminate the solar cell.

12. The apparatus of claim 11 further comprising:
    a sensor system configured to generate information about a response of the group of junctions in the solar cell to at least one of the first light or the second light.

13. The apparatus of claim 11 further comprising:
    a controller configured to select a configuration of at least one of the first filterer or the second filterer.

14. The apparatus of claim 11, wherein the first filterer comprises a first group of filters and wherein the first group of filters outputs the first light with the coarse spectrum having wavelengths and intensities for the light in the selected environment.

15. The apparatus of claim 11, wherein the second filterer comprises a second group of filters and wherein the second group of filters outputs the second light with the fine spectrum having a group of wavelengths and intensities selected for the group of junctions in the solar cell.

16. The apparatus of claim 14, wherein a filter in the first group of filters is a notch blocking filter.

17. The apparatus of claim 15, wherein the second group of filters outputs the second light having the group of wavelengths and intensities in the fine spectrum that causes the group of junctions to generate a group of currents.

18. The apparatus of claim 15, wherein a filter in the second group of filters comprises an optical material and a light intensity changer configured to change an intensity of the light passing through the filter.

19. A solar simulator comprising:
   a cylindrical filter housing having a first side and a second side, wherein light enters the cylindrical filter housing from the first side and exits out of the second side, the cylindrical filter housing having a longitudinal axis;
   a first plurality of first slots arranged in a circular pattern on the second side at a first radius from the longitudinal axis;
   a second plurality of first filters disposed in corresponding ones of the first plurality of first slots, the second plurality of first filters configured to filter the light to a coarse spectrum that is selected based on a standard which sets forth rules for testing a solar cell having a group of junctions;
   a third plurality of second slots arranged in a circular pattern on the second side at a second radius from the longitudinal axis, the second radius being greater than the first radius; and
   a fourth plurality of second filters disposed in corresponding ones of the third plurality of second slots, the fourth plurality of second filters configured to filter the light to a fine spectrum, the fine spectrum being selected specifically for the group of junctions in the solar cell to test the group of junctions, wherein the fine spectrum is configured to generate a current in the solar cell, and wherein the second plurality of first filters and the fourth plurality of second filters are configured such that the fine spectrum is about 10 percent to about 20 percent of a total light from both the second plurality of first filters and the fourth plurality of second filters that will illuminate the solar cell.

20. The solar simulator of claim 19 further comprising a plurality of irises covering corresponding ones of the fourth plurality of second filters, and wherein:
   the second plurality of first filters comprise notch blocking filters; and
   the fourth plurality of second filters comprise notch transmission filters selected to pass specific bands of light.

* * * * *